US008720027B2

(12) United States Patent
Dapkins, Jr. et al.

(10) Patent No.: US 8,720,027 B2
(45) Date of Patent: May 13, 2014

(54) MULTIFUNCTIONAL TACTICAL DEVICE

(75) Inventors: John A. Dapkins, Jr., Bloomsbury, NJ (US); Nicholas Klementowicz, III, Hillsborough, NJ (US)

(73) Assignee: Jersey Tactical Corporation, Lopatcong, NJ (US)

(*) Notice: Subject to any disclaimer, the term of this patent is extended or adjusted under 35 U.S.C. 154(b) by 1475 days.

(21) Appl. No.: 11/823,145

(22) Filed: Jun. 26, 2007

(65) Prior Publication Data

US 2009/0000097 A1 Jan. 1, 2009

(51) Int. Cl.
*B23P 13/00* (2006.01)

(52) U.S. Cl.
USPC .......... 29/275; 29/270

(58) Field of Classification Search
USPC .......... 29/275, 278, 270, 272, 280
See application file for complete search history.

(56) References Cited

U.S. PATENT DOCUMENTS

| | | | | | |
|---|---|---|---|---|---|
| 3,602,969 | A * | 9/1971 | Provost | | 29/275 |
| 4,188,701 | A * | 2/1980 | Ludwig | | 29/275 |
| D290,399 | S * | 6/1987 | Kitchens | | D24/142 |
| 4,681,171 | A | 7/1987 | Kee et al. | | |
| 5,177,850 | A | 1/1993 | Hull et al. | | |
| 5,673,898 | A * | 10/1997 | Michalo | | 254/93 R |
| 5,810,333 | A * | 9/1998 | Hickerson et al. | | 254/93 R |
| 6,035,946 | A | 3/2000 | Studley et al. | | |
| 6,901,644 | B1 * | 6/2005 | Rich | | 29/275 |
| 7,434,785 | B1 * | 10/2008 | McMorrow | | 254/291 |
| D580,732 | S * | 11/2008 | Meagher et al. | | D8/107 |
| 7,451,960 | B2 * | 11/2008 | Kirchner et al. | | 254/1 |
| 2009/0000097 | A1 * | 1/2009 | Dapkins et al. | | 29/275 |

* cited by examiner

*Primary Examiner* — Lee D Wilson

(74) *Attorney, Agent, or Firm* — Ernest D. Buff & Associates, LLC; Ernest D. Buff

(57) ABSTRACT

A multifunctional tactical device for fire, police, military and other tactical invasive and protective actions includes a main elongated housing having a proximal end and a distal end, and having a central axis in its elongated direction; at least one back handle connected to the main housing approximate the proximal end; at least one forward handle connected to the main housing at a location away from the proximal end and away from the distal end; a flat ram area located at the distal end of the main housing, the flat ram area being at an angle of about 70 degrees to about 110 degrees from the central axis; a plurality of claws located at the distal end of the main housing, the plurality of claws extending outwardly therefrom at an angle of about 70 degrees to about 110 degrees from the central axis, at least one of the claws being a flat pry bar claw and at least one of the claws being a tapered shackle busting spike claw.

18 Claims, 4 Drawing Sheets

MULTIFUNCTIONAL TACTICAL DEVICE

BACKGROUND OF INVENTION a. Field of Invention

The invention relates generally to a multifunctional tactical device for serving military, law enforcement, fire and security personnel. The present invention device is a single unit that serves as an extra wide pry bar, a set of claws, a ram, a padlock and shackle buster, a sledgehammer, a window rake, a fireman's tool, a shovel, a tow bar and many other functions. It is the most diversified, most capable and most efficient tactical tool ever offered to serve the men and women who defend and protect us.

b. Description of Related Art

The following patents are representative of the state of the art of tactical devices:

U.S. Pat. No. 6,035,946 to Studley et al. describes an improved forcible entry tool for opening locked or jammed doors by emergency personnel for the purpose of apprehending criminal suspects, gathering evidence, and preserving lives of people who become trapped by fire, earthquake, tornadoes, or by other circumstances beyond their control. The tool of the present invention comprises an elongated frame with a piercing pivot blade on the front end of the tool. The pivot blade is configured to pivot perpendicular to the frame upon penetration through a door, thereby enabling the tool operator to effectively pull back on the tool to break open an outwardly swinging door. A detachable ram head may be mounted over the front end of the frame for purposes of breaking through a door that swings inward (i.e. away from the tool operating personnel).

U.S. Pat. No. 5,177,850 to Hull et al. describes a forcible entry tool which enables law enforcement personnel such as SWAT teams or police or other persons such as firemen to breach a heavily fortified door or the like in a matter of seconds without the use of explosives. A ram is adjustable in weight to suit the needs of an individual and which may be inter-locked with another ram of the same structure in order to "gang" them and several can be locked together, forming a heavy, multi-manned battering ram.

U.S. Pat. No. 4,681,171 to Kee et al. describes a battering ram operable by one person for battering objects that has in one arrangement a concrete-filled tube with first and second ends with an epoxy resin contact face at the first end, a first handle located proximate to the center of gravity of the body, and a second handle located at the second end.

Notwithstanding the prior art, the present invention is neither taught nor rendered obvious thereby.

SUMMARY OF INVENTION

The present invention relates to multifunctional tactical devices for fire, police, military and other tactical invasive and protective actions. The device includes a main elongated housing having a proximal end and a distal end, and having a central axis in its elongated direction; at least one back handle connected to the main housing approximate the proximal end; at least one forward handle connected to the main housing at a location away from the proximal end and away from the distal end; a flat ram area located at the distal end of the main housing, the flat ram area being at an angle of about 70 degrees to about 110 degrees from the central axis; a plurality of claws located at the distal end of the main housing, the plurality of claws extending outwardly therefrom at an angle of about 70 degrees to about 110 degrees from the central axis, at least one of the claws being a flat pry bar claw and at least one of the claws being a tapered shackle busting spike claw.

In some preferred embodiments of the present invention multifunctional tactical device, the plurality of claws extends outwardly from the flat ram area.

In some preferred embodiments of the present invention multifunctional tactical device, the plurality claws have a total external width of at least four inches. In other embodiments, smaller versions may have a total external width less than four inches.

In some preferred embodiments of the present invention multifunctional tactical device, the plurality of claws includes at least three claws with two outer claws and at least one central claw.

In some preferred embodiments of the present invention multifunctional tactical device, the two outer claws are flat pry bar claws and the at least one central claw is a tapered shackle busting spike claw.

In some preferred embodiments of the present invention multifunctional tactical device, flat pry bar claw includes a tapered cutting edge.

In some preferred embodiments of the present invention multifunctional tactical device, the device includes an internal cutting edge at one location selected from the group consisting of the main housing, one claw, and two claws.

In some preferred embodiments of the present invention multifunctional tactical device, the device has a mass of at least twenty pounds.

In some preferred embodiments of the present invention multifunctional tactical device, the plurality of claws includes at least two claws having a tapered space therebetween for placement under objects for pull and lift actions.

In some preferred embodiments of the present invention multifunctional tactical device, the device further includes a flat sledge hammer area at said distal end of the main housing located at an angle of about 70 degrees to about 110 degrees from said flat ram area.

In some preferred embodiments of the present invention multifunctional tactical device, the main housing has a cross sectional shape at a right angle to its central axis that is selected from the group consisting of a circle, an oval, a triangle, a square, a rectangle and a polygon having at least five sides.

The present invention also relates to multifunctional tactical device for fire, police, military and other tactical invasive and protective actions that includes a main elongated hollow housing having a proximal end and a distal end, and having a central axis in its elongated direction, wherein the hollow housing includes a storage area; at least one back handle connected to the main housing approximate the proximal end; at least one forward handle connected to the main housing at a location away from the proximal end and away from the distal end; a flat ram area located at the distal end of the main housing, the flat ram being at an angle of about 70 degrees to about 110 degrees from the central axis; a plurality of claws located at the distal end of the main housing, the plurality of claws extending outwardly there from at an angle of about 70 degrees to about 110 degrees from the central axis, at least one of the claws being a flat pry bar claw and at least one of the claws being a tapered shackle busting spike claw.

In some preferred embodiments of this version of the present invention multifunctional tactical device, the plurality claws extends outwardly from the flat ram area.

In some preferred embodiments of this version of the present invention multifunctional tactical device, the plurality of claws have a total external width of at least four inches.

In some preferred embodiments of this version of the present invention multifunctional tactical device, the plurality of claws includes at least three claws with two outer claws and at least one central claw.

In some preferred embodiments of this version of the present invention multifunctional tactical device, the outer two claws are flat pry bar claws and the at least one central claw is a tapered shackle busting spike claw.

In some preferred embodiments of this version of the present invention multifunctional tactical device, flat pry bar claw includes a tapered cutting edge.

In some preferred embodiments of this version of the present invention multifunctional tactical device, the device includes an internal cutting edge at one location selected from the group consisting of the main housing, one claw, and two claws.

In some preferred embodiments of this version of the present invention multifunctional tactical device, the device has a mass of at least twenty pounds.

In some preferred embodiments of this version of the present invention multifunctional tactical device, the plurality of claws includes at least two claws having a tapered space therebetween for placement under objects for pull and lift actions.

In some preferred embodiments of this version of the present invention multifunctional tactical device, the device further includes a flat sledge hammer area at a the distal end of the main housing located at an angle of about 70 degrees to about 110 degrees from the flat ram area.

In some preferred embodiments of this version of the present invention multifunctional tactical device, the main housing has a cross sectional shape at a right angle to its central axis that is selected from the group consisting of a circle, an oval, a triangle, a square, a rectangle and a polygon having at least five sides.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Figure 1:
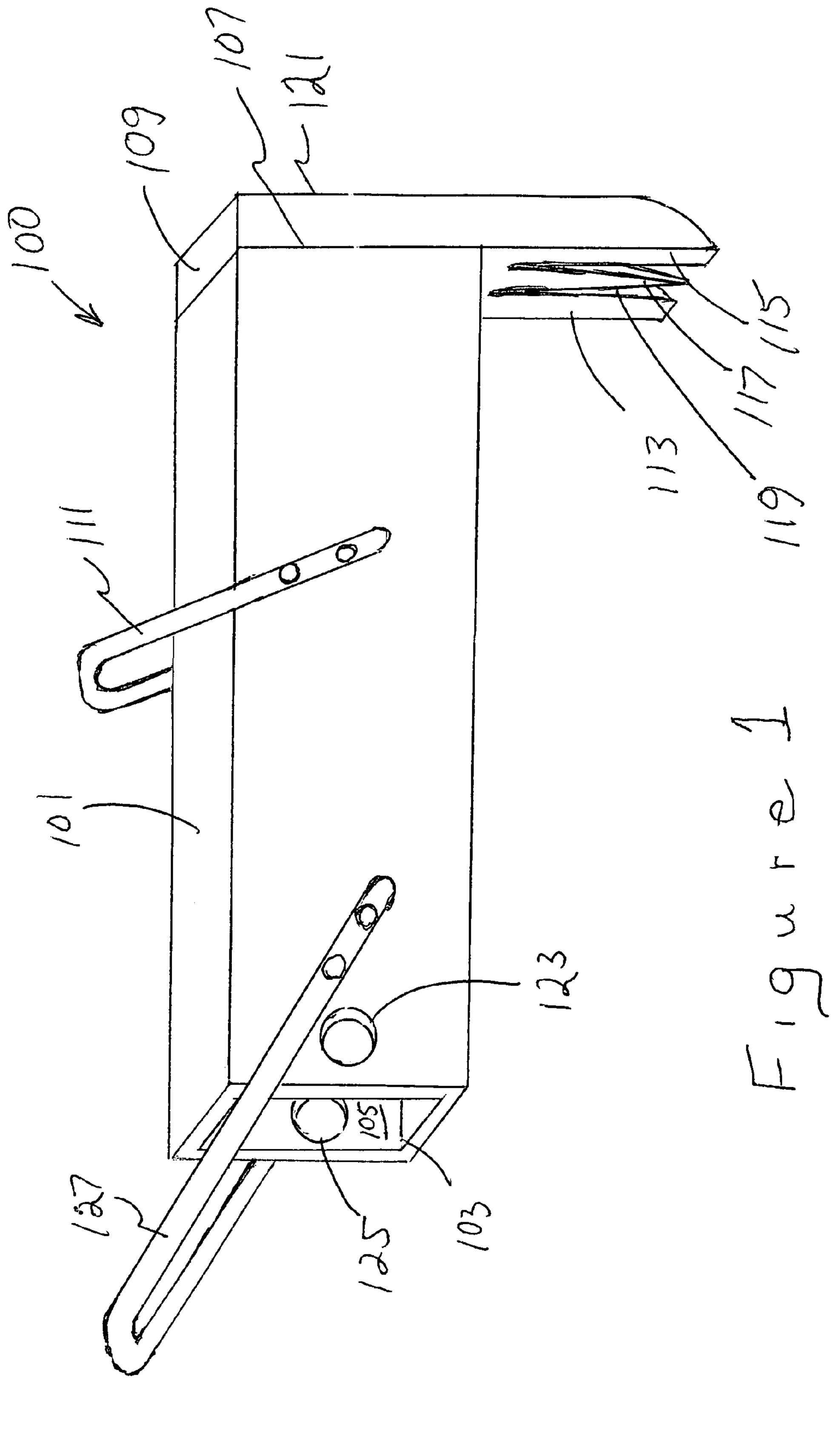
FIG. 1 is a side perspective view of an embodiment of a multifunctional tactical device with a rectangular main housing.

The present invention device may be used as a tool for professionals, and for emergency response personnel, demolition, military, fire, national and other law enforcement entities, including but not limited to police, sheriff, FBI, AFT, DEA, national guard, etc.

The present invention device has more than one hundred diverse uses, including, but not limited to the following top twenty one examples:

(1.) Wide Pry Bar: With a plurality of claws and a preferred external claw width of at least four inches, this device will easily pry open almost any door.

(2.) Double Fork Pry Bar: The plurality of claws enables a user to break a door with both a knob lock and a separate dead bolt lock, in one action.

(3.) Ram: The front (distal) end has a large flat ram that easily busts through doors, shattered windows, etc and is more effective and more powerful than commercially popular ram devices.

(4.) Padlock Buster: The claws may grip and pull right through a padlock, i.e., rip it off its hasp or eyelets. Alternatively, the claws may be positioned with the spike claw inside the lock shackle and the device hammered or struck to shatter the lock.

(5.) Shackle Buster: The claws will grip and break right through shackles.

(6.) Hammer Claws: The claws may be used like a large set of hammer claws and pull large bolts and spikes and rip through wood, metal etc., by being slid under the item and either pulling or push-levering, like a hammer removing nails or ripping off a piece of wood.

(7.) Sledge Hammer: with the claws facing away from the target, the flat sledge hammer area may be used to smash upon the target or as a driver to drive in something large, e.g. emergency tent spikes.

(8.) Wall Buster: Given the size and weight of various embodiments, the present invention device will manually break wood, wood and drywall, and other construction material walls. It even breaks through block walls without machines or hydraulics.

(9.) Diversion Tool: The present invention devices may be thrown through closed windows followed by tear gas and other diversionary devices.

(10.) Window Rake: The present invention devices are extremely efficient at raking out broken window glass wooden cross member, shades, etc. to create clear passage areas.

(11.) Fireman's Tool: The present invention devices are excellent tools for ripping apart burning debris, beams, walls, etc.

(12.) Shovel: The present invention devices are powerful manual shovels, using the claws for digging.

(13.) Step Booster: When placed against a wall or building, the present invention devices aid police and others to reach windows, sealed walls, etc.

(14.) Tow Bar: the present invention devices may be used to pull items when connected to a chain on rope and vehicle.

(15.) Wood Splitter: In a military environment or otherwise where firewood or fuel is needed, the present invention device is an excellent log splitter.

(16.) Weapon: In extreme circumstances, the present invention devices will outpower and destroy knife, machete, bayonet, or other weapon and will effectively take on plural attackers in seconds.

(17.) Stump Remover: The present invention devices are effective for removal of stumps and other earth-embedded items.

(18.) Emergency Door Brace: To protect a single soldier or law enforcement officer or to lock up an escape route, the present invention devices may be forced under a door to prevent opening from the opposite side.

(19.) Hinge Remover: For gates and large doors and even steel and other metal doors, the present invention devices are excellent hinge removal devices.

(20.) Storage Box: The hollow versions of the present invention devices may be used to store other tactical or useful law enforcement/emergency service/military items e.g. a fire blanket or a flexible stretcher.

(21.) Chain Buster: The spike claws of present invention multifunctional tactical device may be inserted into a chain link and hammered so as to bust open the link and thereby break the chain. In this application, as in others above, a second present invention device may be inserted and used as the hammer.

The above twenty one uses include many of the preferred uses, but many other uses are also viable with the present invention devices.

FIG. 1 illustrates a present invention multifunctional tactical device 100. It includes a main housing 101 with a proximal end 103 and a distal end 107. In this embodiment, main housing 101 is rectangular in cross-section and is hollow with proximal end 103 open to create storage area 105. Distal end 107 includes ramming plate 121 welded or otherwise attached to main housing 101. Plate 121 may be used for all of the above purposes stated and is an effective battering ram when held by two hands at handles 127 and 111, swung back and thrust forward.

Claws 113, 115, and 117 function together to make an extremely wide claw width that is superb for prying open doors and gates, ripping windows, and many other uses as said forth above. In addition, claw 117 is a spike claw that may be positioned in a lock keyhole or shackle that will pierce and shatter the lock when device 100 is struck at its top. Additionally, flat claws 113 and 115 have tapered edges for various penetration and leverage actions. Further, when inverted, device 100 becomes a driving device and sledgehammer, particularly at surface 109. Orifices 123 and 125 at proximal end 103 may be used for insertion of ropes or chains and device 100 may then be used as a tow or pull device. For example, when attached to a vehicle or pulled by a team of men, device 100 may be used to pull down and topple an entire wall or other large objects.

When device 100 is stood up vertically like a boot, it may be used as a support for a post, rifle rest, or may be used as a stopping device, e.g., when pinned under a doorknob or door bottom to prevent escape. It may also be used as a step to facilitate high level entry or even as a grapple.

Figure 2:
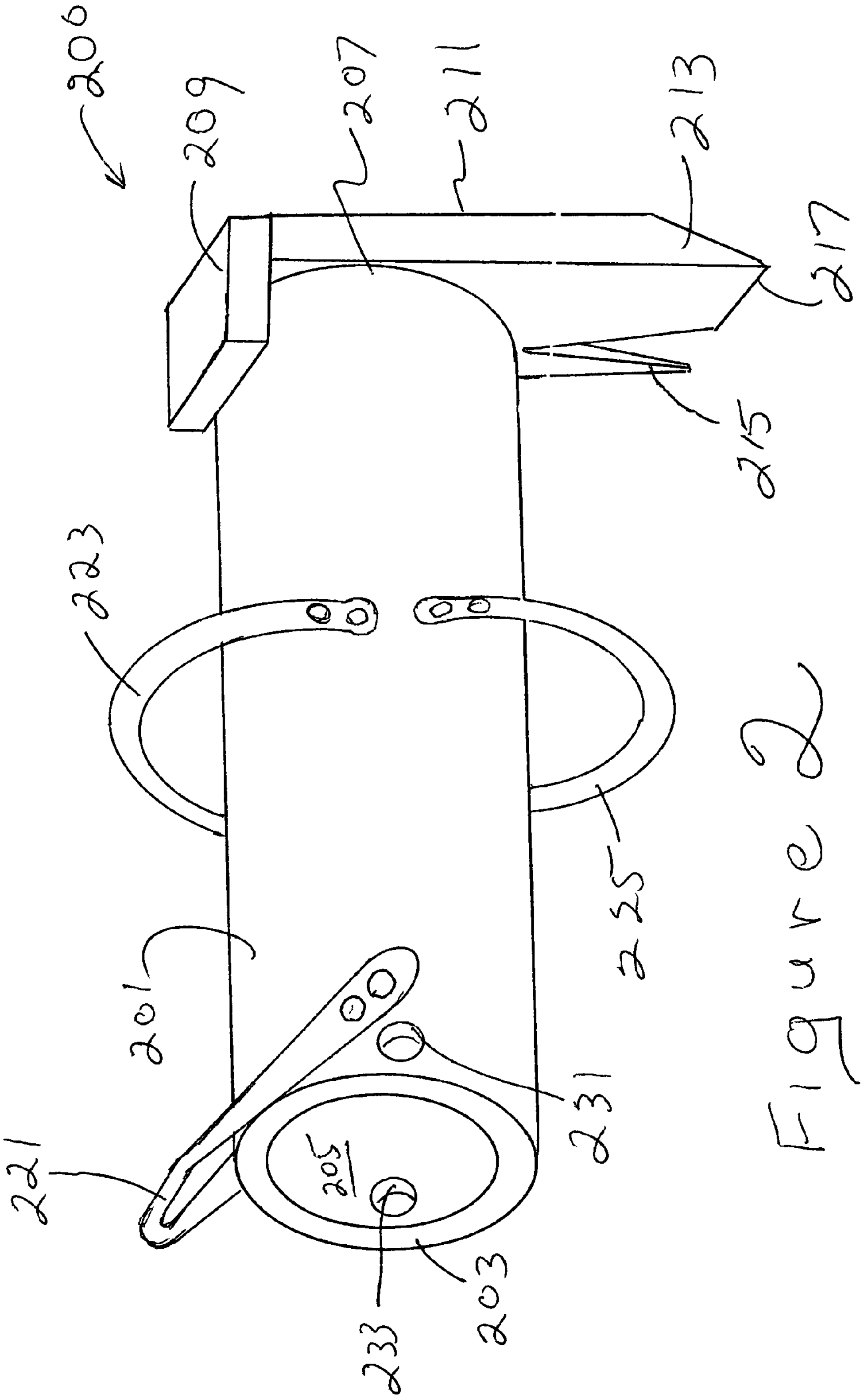
FIG. 2 is a side perspective view of another embodiment of a present invention multifunctional tactical device.

FIG. 2 illustrates a present invention multifunctional tactical device 200. It includes a main housing 201 with a proximal end 203 and a distal end 207. In this embodiment, main housing 201 has a circular cross-section and is hollow with proximal end 203 open to create storage area 205. Distal end 207 includes ramming plate 211 welded or otherwise attached to main housing 201. Plate 211 may be used for all of the above purposes stated and is an effective battering ram when held by two hands at handles 221 and 223, swung back and thrust forward.

Claws 215 and 217 function together to make an extremely wide claw width that is superb for prying open doors and gates, ripping windows, and many other uses as said forth above. In addition, claw 215 is a spike claw that may be positioned in a lock keyhole or shackle that will pierce and shatter the lock when device 200 is struck at its top. Additionally, flat claw 217 has a tapered edge for various penetration and leverage actions. Further, when inverted, device 200 becomes a driving device and sledgehammer, particularly at surface 209. Orifices 231 and 233 at proximal end 203 may be used for insertion of ropes or chains and device 200 may then be used as a tow or pull device. For example, when attached to a vehicle or pulled by a team of men, device 200 may be used to pull down and topple an entire wall or other large objects.

When device 200 is stood up vertically like a boot, it may be used as a support for a post, rifle rest, or may be used as a stopping device, e.g., when pinned under a doorknob or door bottom to prevent escape. It may also be used as a step to facilitate high level entry or even as a grapple. Additionally, in this embodiment, handles 223 and 225 are diametrically opposed so that the device 200 may be used as a vertical hammering device by being held on opposite sides and reciprocally pulled up and dropped or pushed down.

Figure 3:
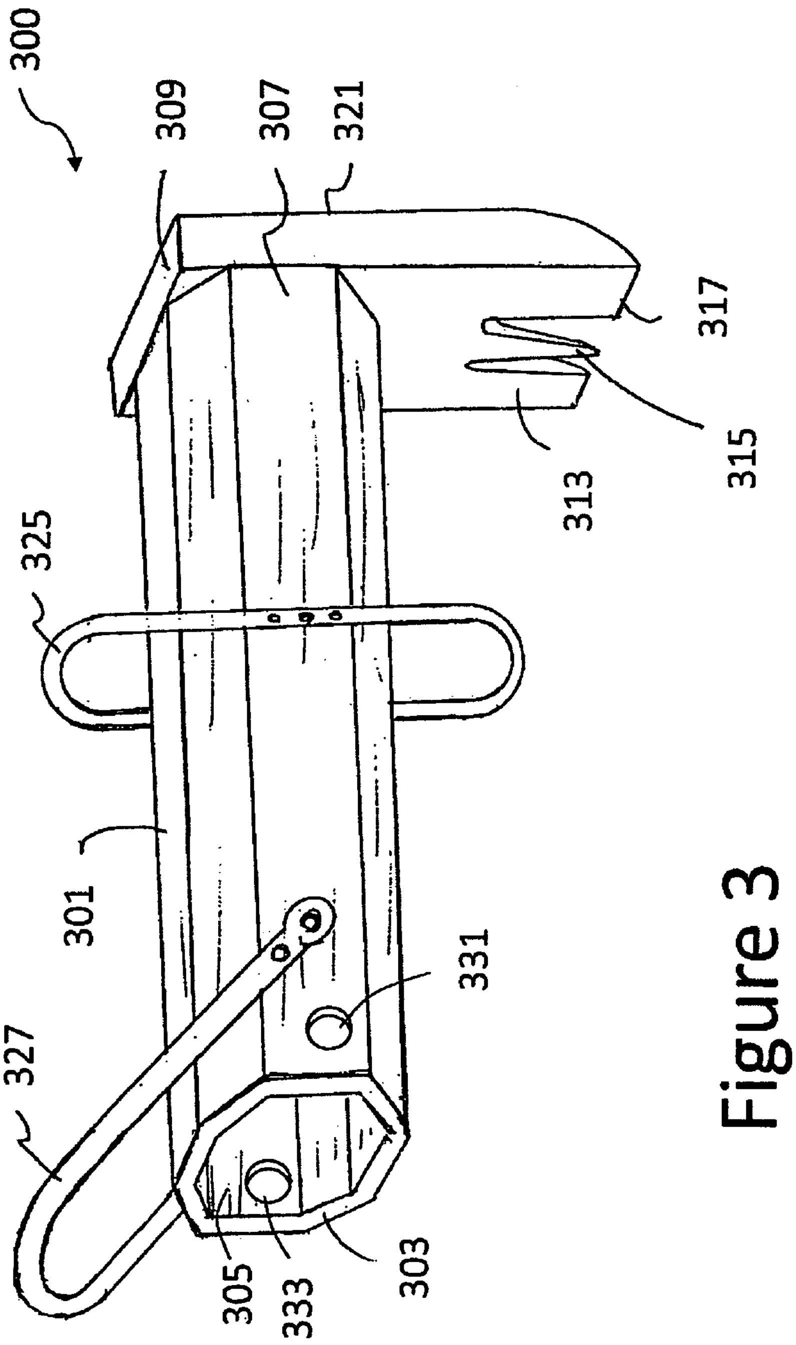
FIG. 3 is another embodiment of a present invention multifunctional tactical device.

FIG. 3 illustrates a present invention multifunctional tactical device 300. It includes a main housing 301 with a proximal end 303 and a distal end 307. In this embodiment, main housing 301 has a hexagonal cross-section and is hollow with proximal end 303 open to create storage area 305. Distal end 307 includes ramming plate 321 welded or otherwise attached to main housing 301. Plate 321 may be used for all of the above purposes stated and is an effective battering ram when held by two hands at handles 325 and 327, swung back and thrust forward. Also, because handle 325 extends to the bottom, device 300 may be used upright in a vertical position and used as a hammer, vertical driver or tamping device by holding opposite sides of handle 325 and moving vertically in a reciprocal motion.

Claws 313, 315 and 317 function together to make an extremely wide claw width that is superb for prying open doors and gates, ripping windows, and many other uses as said forth above. In addition, claw 315 is a spike claw that may be positioned in a lock keyhole or shackle that will pierce and shatter the lock when device 300 is struck at its top. Additionally, flat claws 313 and 317 have tapered edges for various penetration and leverage actions. Further, when inverted, device 300 becomes a driving device and sledgehammer, particularly at surface 309. Orifices 331 and 333 at proximal end 303 may be used for insertion of ropes or chains and device 300 may then be used as a tow or pull device. For example, when attached to a vehicle or pulled by a team of men, device 300 may be used to pull down and topple an entire wall or other large objects.

When device 300 is stood up vertically like a boot, it may be used as a support for a post, rifle rest, or may be used as a stopping device, e.g., when pinned under a doorknob or door bottom to prevent escape. It may also be used as a step to facilitate high level entry or even as a grapple.

Figure 4:
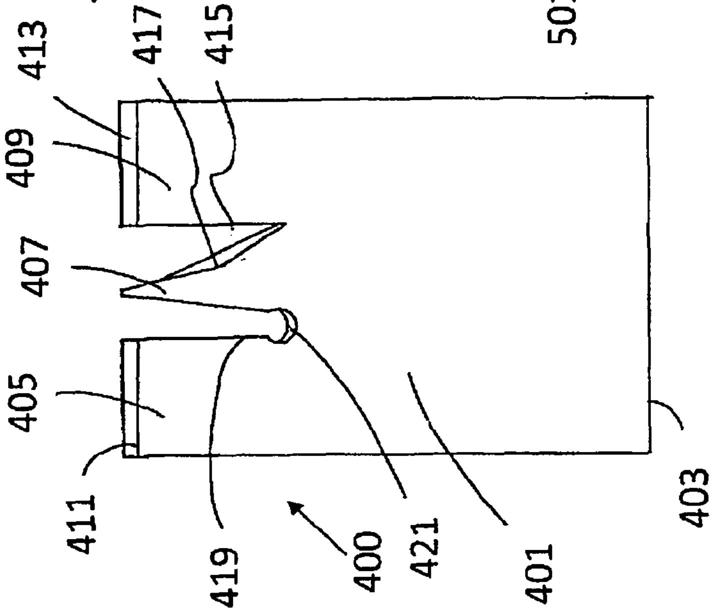
FIG. 4 is a front view of another alternative embodiment present invention multifunctional tactical device; and, FIG. 5 is a front view of yet another alternative embodiment present multifunctional tactical device.

FIG. 4 shows a front-end view of a present invention multifunctional tactical device front plate 401. It includes a sledgehammer surface 403, two wide claws 405 and 409 and one spike claw 407. Additionally, there is a notch 419 with a sharp crescent edge for cutting telephone lines, cords, ropes, wires, etc., and a notch 415 with a straight cutting edge 417 for similar or different cutting purposes. Finally, both wide claws 405 and 409 have cutting edges 411 and 413 so that the device may be used like a hatchet, axe, or pick. In some embodiments, the crescent blade and/or the straight cutting edge blade may be integrally formed with the front plate as a single structure, while in other embodiments, the blades may be separate pieces that are screwed to or otherwise removably attached to the device for replacement as needed.

Figure 5:
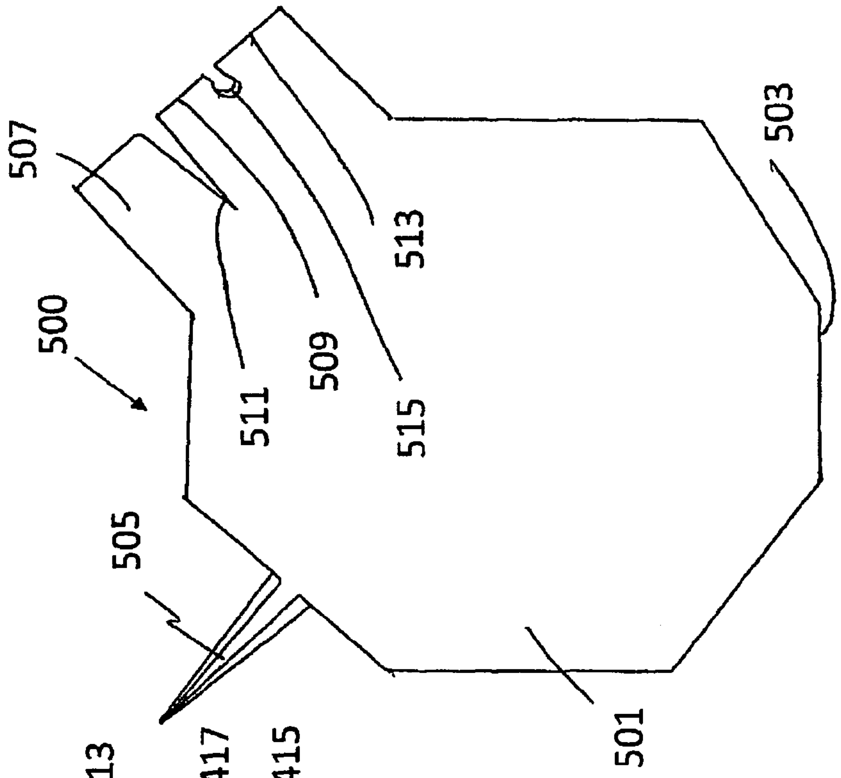

FIG. 5 shows a front-end view of a present invention multifunctional tactical device front plate 501 that has a generally hexagonal shape but with a spike claw 505 and wide claws 507, 509 and 511 at right angles to spike claw 505. It includes a sledgehammer surface 503. Additionally, there is a notch 515 with a sharp crescent edge for cutting telephone lines, cords, ropes, wires, etc., and a notch 511 for pulling nails, spikes, bolts and the like.

Although the present invention multifunctional tactical devices may be hand carried, it is preferred that one or two straps be attached thereto for shoulder or over the shoulder transport purposes. Preferred are straps with quick-release mechanisms and/or velcro-type attachments.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A multifunctional tactical device for fire, police, military and other tactical invasive and protective actions, which device comprises:

a) a main elongated housing having a proximal end and a distal end, and said housing being elongated along a central axis;

b) at least one back handle connected to said main housing approximate said proximal end;

c) at least one forward handle connected to said main housing at a location away from said proximal end and away from said distal end;

d) a flat ram area located at said distal end of said main housing, said flat ram area being at an angle of about 70 degrees to about 110 degrees from said central axis;

e) a plurality of claws located at said distal end of said main housing, said plurality of claws extending outwardly therefrom at an angle of about 70 degrees to about 110 degrees from said central axis, at least one of said claws being a flat pry bar claw and at least one of said claws being a tapered shackle busting spike claw;

f) said plurality of claws extends outwardly from said flat ram area; and g) said multifunctional tactical device having a mass of at least twenty pounds.

2. The multifunctional tactical device for fire, police, military and other tactical invasive and protective actions of claim 1 wherein said plurality claws have a total external width of at least four inches.

3. The multifunctional tactical device for fire, police, military and other tactical invasive and protective actions of claim 1 wherein said plurality of claws includes at least three claws with two outer claws and at least one central claw.

4. The multifunctional tactical device for fire, police, military and other tactical invasive and protective actions of claim 3 wherein said two outer claws are flat pry bar claws and said at least one central claw is a tapered shackle busting spike claw.

5. The multifunctional tactical device for fire, police, military and other tactical invasive and protective actions of claim 1 wherein flat pry bar claw includes a tapered cutting edge.

6. The multifunctional tactical device for fire, police, military and other tactical invasive and protective actions of claim 1 wherein said device includes an internal cutting edge at one location selected from the group consisting of said main housing, one claw, and two claws.

7. The multifunctional tactical device for fire, police, military and other tactical invasive and protective actions of claim 1 wherein said plurality of claws includes at least two claws having a tapered space therebetween for placement under objects for pull and lift actions.

8. The multifunctional tactical device for fire, police, military and other tactical invasive and protective actions of claim 1 wherein said device further includes a flat sledge hammer area at said distal end of said main housing located at an angle of about 70 degrees to about 110 degrees from said flat ram area.

9. The multifunctional tactical device for fire, police, military and other tactical invasive and protective actions of claim 1 wherein said main housing has a cross sectional shape at a right angle to said central axis that is selected from the group consisting of a circle, an oval, a triangle, a square, a rectangle and a polygon having at least five sides.

10. A multifunctional tactical device for fire, police, military and other tactical invasive and protective actions, which device comprises:

a) a main elongated hollow housing having a proximal end and a distal end, and said housing being elongated along a central axis, wherein said hollow housing includes a storage area;

b) at least one back handle connected to said main housing approximate said proximal end;

c) at least one forward handle connected to said main housing at a location away from said proximal end and away from said distal end;

d) a flat ram area located at said distal end of said main housing, said flat ram being at an angle of about 70 degrees to about 110 degrees from said central axis;

e) a plurality of claws located at said distal end of said main housing, said plurality of claws extending outwardly there from at an angle of about 70 degrees to about 110 degrees from said central axis, at least one of said claws being a flat pry bar claw and at least one of said claws being a tapered shackle busting spike claw;

f) said plurality of claws extends outwardly from said flat ram area; and g) said multifunctional tactical device having a mass of at least twenty pounds.

11. The multifunctional tactical device for fire, police, military and other tactical invasive and protective actions, of claim 10 wherein said plurality of claws have a total external width of at least four inches.

12. The multifunctional tactical device for fire, police, military and other tactical invasive and protective actions of claim 10 wherein said plurality of claws includes at least three claws with two outer claws and at least one central claw.

13. The multifunctional tactical device for fire, police, military and other tactical invasive and protective actions of claim 12 wherein said outer two claws are flat pry bar claws and said at least one central claw is a tapered shackle busting spike claw.

14. The multifunctional tactical device for fire, police, military and other tactical invasive and protective actions of claim 10 wherein flat pry bar claw includes a tapered cutting edge.

15. The multifunctional tactical device for fire, police, military and other tactical invasive and protective actions of claim 10 wherein said device includes an internal cutting edge at one location selected from the group consisting of said main housing, one claw, and two claws.

16. The multifunctional tactical device for fire, police, military and other tactical invasive and protective actions of claim 10 wherein said plurality of claws includes at least two claws having a tapered space therebetween for placement under objects for pull and lift actions.

17. The multifunctional tactical device for fire, police, military and other tactical invasive and protective actions of claim 10 wherein said device further includes a flat sledge hammer area at a said distal end of said main housing located at an angle of about 70 degrees to about 110 degrees from said flat ram area.

18. The multifunctional tactical device for fire, police, military and other tactical invasive and protective actions of claim 10 wherein said main housing has a cross sectional shape at a right angle to said central axis that is selected from the group consisting of a circle, an oval, a triangle, a square, a rectangle and a polygon having at least five sides.

* * * * *